US006340961B1

(12) United States Patent
Tanaka et al.

(10) Patent No.: US 6,340,961 B1
(45) **Date of Patent: *Jan. 22, 2002**

(54) METHOD AND APPARATUS FOR DISPLAYING MOVING IMAGES WHILE CORRECTING FALSE MOVING IMAGE CONTOURS

(75) Inventors: Akira Tanaka; Takuya Watanabe; Hachiro Yamada, all of Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,001

(22) Filed: Oct. 15, 1998

(30) Foreign Application Priority Data

Oct. 16, 1997 (JP) ............................................ 9-283747

(51) Int. Cl.[7] ............................................... G06F 15/00
(52) U.S. Cl. ................................ 345/63; 84/88; 84/89; 84/90; 84/690
(58) Field of Search ............................. 345/63, 84, 88, 345/89, 90, 690

(56) References Cited

U.S. PATENT DOCUMENTS

| | | | | |
|---|---|---|---|---|
| 4,488,174 A | * 12/1984 | Mitchell et al. | ............ | 348/415 |
| 5,270,688 A | * 12/1993 | Dawson et al. | ............. | 345/150 |
| 5,483,634 A | * 1/1996 | Hasegawa | ................... | 395/501 |
| 5,818,419 A | * 10/1998 | Tajima et al. | ............... | 345/147 |
| 5,973,657 A | * 10/1999 | Okada et al. | ................. | 345/89 |

FOREIGN PATENT DOCUMENTS

| | | |
|---|---|---|
| EP | 0720139 A2 * | 12/1994 |
| EP | 0 707 302 A2 | 4/1996 |
| EP | 0 714 085 A1 | 5/1996 |
| EP | 0 720 139 A2 | 7/1996 |
| EP | 0 837 441 A1 | 4/1998 |
| JP | 6-332399 | 12/1994 |
| JP | 7-7702 | 1/1995 |
| JP | 7-271325 | 10/1995 |
| JP | 8-54852 | 2/1996 |
| JP | 8-234694 | 9/1996 |
| JP | 9-34401 | 2/1997 |
| JP | 9-244576 | 9/1997 |
| KR | 94-12382 | 6/1994 |

* cited by examiner

*Primary Examiner*—Bipin Shalwala
*Assistant Examiner*—Vincent E. Kovalick
(74) *Attorney, Agent, or Firm*—Sughrue Mion, PLLC

(57) ABSTRACT

When gradation data of a present frame is corrected in combination with gradation data of a preceding frame for each display pixel, the level of correction is controlled according to a predetermined dispersion pattern corresponding to a matrix of pixels on a plasma display panel. The display pixels where the gradation level varies in the same way are not corrected uniformly, but some are excessively corrected and some are uncorrected such that they are mixed in a two-dimensional pattern. Moving images displayed on the plasma display panel with gradations expressed according to the subfield process for pixels are prevented from suffering false moving image contours.

27 Claims, 9 Drawing Sheets

Fig. 2a
(Prior Art)
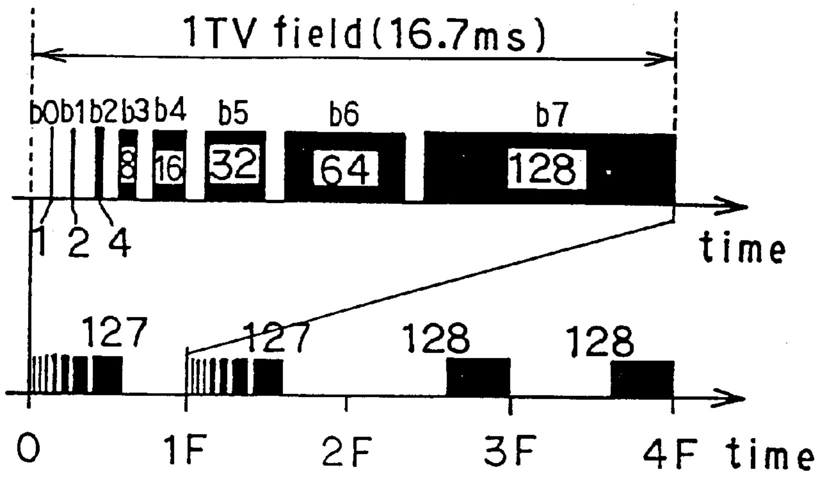
Fig. 2b
(Prior Art)
Fig. 3
(Prior Art)

METHOD AND APPARATUS FOR DISPLAYING MOVING IMAGES WHILE CORRECTING FALSE MOVING IMAGE CONTOURS

BACKGROUND OF THE INVENTION

1. Field of the Invention

The present invention relates to a method and an apparatus for displaying moving images by controlling the levels of gradations of a matrix of display pixels on a display panel with drive pulses, and more particularly to such a method and an apparatus for displaying moving images while correcting false moving image contours.

2. Description of the Related Art

One of various display units capable of displaying moving images is a plasma display panel. The plasma display panel displays images through emission of light from phosphors based on electric discharges, and is expected to attract much attention as a panel-type display unit which emits light on its own with high luminance.

There are basically two types of plasma display panels, i.e., a DC (Direct Current) plasma display panel and an AC (Alternating Current) plasma display panel. Since the AC plasma display panel has electrodes not exposed in a discharge space, the AC plasma display panel is said to be more durable than the DC plasma display panel where electrodes are exposed in a discharge space.

AC plasma display panels are classified into opposed discharge design and surface discharge design. The opposed discharge structure has vertical and horizontal electrodes facing each other across a discharge space. The surface discharge structure has pairs of surface discharge electrodes comprising scanning and sustaining electrodes, which are disposed on a flat surface.

AC plasma display panels are promising as large-size full-color flat display panels because they provide a large memory margin and have good light emission efficiency.

One conventional AC plasma display panel will be described below with reference to FIG. 1 of the accompanying drawings.

As shown in FIG. 1, a plasma display panel 100 comprises a plurality of surface discharge electrodes 101 extending parallel to rows and spaced successively along columns. Each of the surface discharge electrodes 101 comprises a scanning electrode 102 and a sustaining electrode 103 which are disposed parallel to each other.

A plurality of data electrodes 104 extending parallel to the columns are disposed in opposed relation to the surface discharge electrodes 101. The data electrodes 104 are spaced successively along the rows.

Discharge spaces 105 filled with a discharge gas such as of helium, neon, xenon, or the like are provided between the electrodes 101, 104, forming display cells capable of individually emitting light at the points of intersection between the surface discharge electrodes 101 and the data electrodes 104.

The scanning and sustaining electrodes 102, 103 are disposed as electrical conductive thin films on a glass substrate 106. The data electrodes 104 are printed as electrical conductors on another glass substrate 107.

A white glazed layer 108 is deposited on the data electrodes 104 and positioned underneath a plurality of partitions 109 extending parallel to the columns and spaced successively along the rows.

Gaps defined between the partitions 109 are disposed as the discharge spaces 105 in opposed relation to the data electrodes 104. Phosphor layers 110 are coated on surfaces which define the discharge spaces 105.

A dielectric layer 111 is positioned in facing relation to the surface discharge electrodes 101.

A plurality of data drivers are connected respectively to the data electrodes 104, and a plurality of scan drivers are connected respectively to the scanning electrodes 102.

One or more sustain drivers are connected to the sustaining electrodes 103. These drivers jointly make up a driver circuit (not shown) for the plasma display panel 100.

The display pixels arranged in a two-dimensional matrix on the screen of the display panel are individually controlled for light emission to display desired images in dot matrix patterns.

A process of displaying an image on the plasma display panel 100 shown in FIG. 1 will be described below.

In a preparatory mode, preliminary discharge pulses are applied between the scanning electrodes 102 and the sustaining electrodes 103 of the plasma display panel 100 to produce preliminary discharges between those electrodes. With the preliminary discharges thus produced, discharges will stably be developed in the plasma display panel 100 for displaying images.

Then, the scan drivers apply progressively shifted scanning pulses respectively to the scanning electrodes 102, and the data drivers apply data pulses to certain data electrodes 104 which correspond to an image to be displayed, in synchronism with the scan drivers. The positions of all display pixels are progressively scanned to write wall charges in those display pixels which correspond to the image to be displayed.

Then, sustaining pulses are applied as drive pulses to all the scanning electrodes 102 and all the data electrodes 104. Then, only the phosphor layers 110 of the display pixels in which the wall charges have been written emit light, displaying a dot matrix of image with binary values on the plasma display panel 100.

There has been a demand for the display of images in multiple gradations on the plasma display panel 100. One process for meeting such a demand is a subfield process.

The subfield process will be described below. The display pixels which correspond to the image to be displayed emit light when sustaining pulses are applied with the wall charges being written in those display pixels. Therefore, the luminance of emitted light can be adjusted when the number of applied sustaining pulses is controlled.

One frame which represents a unit of time for displaying images is divided into a plurality of subfields, and sustaining pulses are established in advance as drive pulses of various durations for those subfields.

For example, if a video signal is to be represented in 256 8-bit binary gradation levels, then, as shown in FIG. 2*a* of the accompanying drawings, there are established subfields in one frame which serve as sustained emission periods for applying sustaining pulses at the ratio of "1, 2, 4, . . . , 128".

By appropriately combining the sustaining pulses in those subfields, it is possible to change the number of sustaining pulses in one frame within the range of 256 pulses. Therefore, the matrix of display pixels on the plasma display panel 100 can be energized in a time-division multiplex fashion.

For example, if the gradation level of a certain display pixel is "127", then, as shown in a left-hand side of FIG. 2*b* of the accompanying drawings, trains of sustaining pulses in 7 subfields that are weighted respectively by "1, 2, . . . , 64" are applied to the display pixel. Consequently, 7 trains of sustaining pulses which are weighted by "127" are applied to the display pixel in the period of one frame.

If the gradation level of a certain display pixel is 128, then, as shown in a right-hand side of FIG. 2*b*, sustaining pulses of one subfield which is weighted by "128" are applied to the display pixel in the period of one frame.

When the plasma display panel 100 is energized according to the subfield process, since the number of sustaining pulses applied in one frame to display pixels on the plasma display panel 100 can be adjusted, displayed images can be expressed in gradations.

However, some moving images displayed according to the subfield process tend to suffer interferences.

For example, when an image whose lightness varies smoothly, e.g., an image of a cheek of a human's face, moves on the display screen, a dark or bright contour may appear in an image region which should be smooth.

When a color image is displayed, it may suffer a color-shifted contour or a reduction in resolution.

Such interferences are referred to as false moving image contours.

In a displayed color image, since bit carry points for the respective colors are spatially different from each other, interferences occur at different positions with respect to the respective colors.

While these interferences may be referred to as false color contours, they are essentially generated by a combination of false moving image contours for the respective colors in a displayed color image.

Such a phenomenon is responsible for color shifts or reductions in resolution in the display of moving images.

FIG. 2*b* illustrates a situation in which the gradation level of a certain display pixel varies from "127" to "128". In the gradation level of "127", sustaining pulses are concentrated in the first half of the frame. In the gradation level of "128", sustaining pulses are concentrated in the second half of the frame. Therefore, a blank period free of sustained emission is present between frames across a transition from the gradation level of "127" to the gradation level of "128". Because the display pixel does not emit light for a period of time longer than the preceding and following frames, the gradation level of the display pixel which is actually visually perceived by the human eye is lower than the gradation level that is to be displayed.

Conversely, when the gradation level of a certain display pixel varies from "128" to "127", as shown in FIG. 3 of the accompanying drawings, the gradation level of the display pixel is actually visually perceived as being lower than the gradation level that is to be displayed because the light emission in subfields is concentrated in a short period of time.

For varying the gradation level of a display pixel on a CRT (Cathode-Ray Tube) display unit, the intensity of the electron beam may be modulated to adjust the luminance of the display pixel in an analog fashion. A number of display pixels on the CRT display unit are successively scanned in order to display an image on the CRT display unit. Since the successive scanning of the display pixels is completed in an instantaneous period of time, the CRT display unit does not suffer false moving image contours.

In apparatus for displaying moving images according to the subfield process, such as plasma display panels, each gradation bit is displayed in a time-division multiplex fashion at a low speed in a period of time close to the duration of one field, and the observer visually combines displayed gradation bits as one image based on the spatial integration performed by the human eye.

If a visually combined image is a moving image, then a clear bright-line interference or dark-line interference occurs when the moving image is followed by the eye. Specifically, when pixels visually perceived as bright or dark pixels are followed by the eye, they are combined as a bright or dark line fixedly on the retina.

The principles of generation of false moving image contours have been described above.

Processes for eliminating false moving image contours have been disclosed in Japanese Patent Laid-Open Publication No. 271325/95, Japanese Patent Laid-Open Publication No. 54852/96, and Japanese Patent Laid-Open Publication No. 234694/96, for example.

According to the processes disclosed, combinations of gradation data which make actually displayed gradations inappropriate are registered in advance. If gradation data of a preceding frame and gradation data of a present frame match any of the registered combinations, then sustaining pulses to be outputted for the gradation data of the present frame are corrected to a predetermined form.

Therefore, display pixels whose gradation levels vary according to any of the registered combinations of gradation data are supplied with sustaining pulses that have been corrected to make displayed gradations appropriate. As a result, a moving image is prevented from suffering a false contour such as a bright line or a dark line.

Moving image display apparatus revealed in the above publications register combinations of gradation data which make actually displayed gradations inappropriate in advance, and correct sustaining pulses to prevent the gradations of display pixels from being inappropriate when any of the registered combinations is detected.

Actually, however, it is difficult to optimally correct the displayed levels of multiple gradations. Particularly, it is difficult to thoroughly eliminate inadequately colored lines from fully colored images. For example, while it is possible to produce corrective settings for sufficiently eliminating false contours from images which are moving at a certain speed, the levels of such corrective settings will be improper, tending to generate bright and dark lines adjacent to each other, when images are moving at speeds higher and lower than the expected speed.

SUMMARY OF THE INVENTION

It is therefore an object of the present invention to provide a method and an apparatus for displaying moving images while appropriately correcting false contours of the moving images.

A method according to the present invention displays a moving image by dividing a frame into a plurality of subfields having different relative luminance ratios and displaying a moving image of multiple gradations on a display panel having a matrix of display pixels.

The method comprises the steps of producing new n (n is a natural number) corrected video gradation data from video gradation data of a preceding frame and video gradation data of a present frame for each of the display pixels, selecting at least two of the video gradation data of the preceding frame, the video gradation data of the present frame, and the n corrected video gradation data, and displaying the selected video gradation data at display pixels of a predetermined selection pattern.

According to this method, the gradation levels of display pixels in a region where a false moving image contour occurs are not corrected uniformly, but excessively corrected display pixels and uncorrected display pixels are mixed together in a two-dimensional pattern. Therefore, the false moving image contour is effectively prevented from occurring.

An apparatus for displaying a moving image according to the present invention includes data input means, data storage means, and data correcting means. The data input means enters data, and the data storage means stores video gradation data of a preceding frame corresponding to unit pixels of the display pixels. The data correcting means produces new n (n is a natural number) corrected video gradation data from the video gradation data of the preceding frame stored in said data storage means and video gradation data of a present frame from the data input means. The apparatus divides a frame into a plurality of subfields having different relative luminance ratios and displays a moving image of multiple gradations.

The apparatus also has correction control means. The correction control means combines a plurality of video gradation data including at least two of the video gradation data of the preceding frame, the video gradation data of the present frame, and the n corrected video gradation data, and disperses the combined video gradation data in a pixel plane of the display pixels according to a predetermined selection pattern.

The display pixels arranged in a matrix normally display images at gradation levels corresponding to video gradation data. If a combination of gradation data of a preceding frame and gradation data of a present frame is such that it generates a false moving image contour, then the gradation data is corrected to prevent the false moving image contour from occurring.

Since the degrees of data conversion for the respective display pixels are dispersed according to a selection pattern, the gradation levels of display pixels in a region where a false moving image contour occurs are not corrected uniformly, but excessively corrected display pixels and uncorrected display pixels are mixed together in a two-dimensional pattern.

With the above apparatus, because the gradation levels of display pixels in a region where a false moving image contour occurs are not corrected uniformly, but are corrected such that excessively corrected display pixels and uncorrected display pixels are mixed together in a two-dimensional pattern. Consequently, it is possible to effectively prevent a false moving image contour from occurring.

The apparatus for displaying moving images according to the present invention has a matrix of display pixels on a display panel for displaying gradations according to the subfield process. The apparatus may comprise a plasma display apparatus or a DMD, for example, as long as it can display moving images on its display panel.

The means referred above may be arranged in any way that allows them to perform their functions, and may be a dedicated hardware arrangement, a computer programmed to perform the functions, functions implemented in a computer by an arbitrary program, or any of combinations thereof.

The above and other objects, features, and advantages of the present invention will become apparent from the following description with reference to the accompanying drawings which illustrate examples of the present invention.

BRIEF DESCRIPTION OF THE DRAWINGS

FIG. 2*a* is a diagram showing an arrangement of subfields in one frame according to a subfield process used with respect to the conventional plasma display panel;

FIG. 2*b* is a timing chart of drive pulses which are generated when the gradation level of gradation data varies in a pattern;

FIG. 3 is a timing chart of drive pulses which are generated when the gradation level of gradation data varies in another pattern;

DETAILED DESCRIPTION OF THE PREFERRED EMBODIMENTS

A plasma display apparatus 1 as a moving image display apparatus according to a first embodiment of the present invention will be described below with reference to FIGS. 4, 5, 6, and 7*a* through 7*g*.

Figure 1:
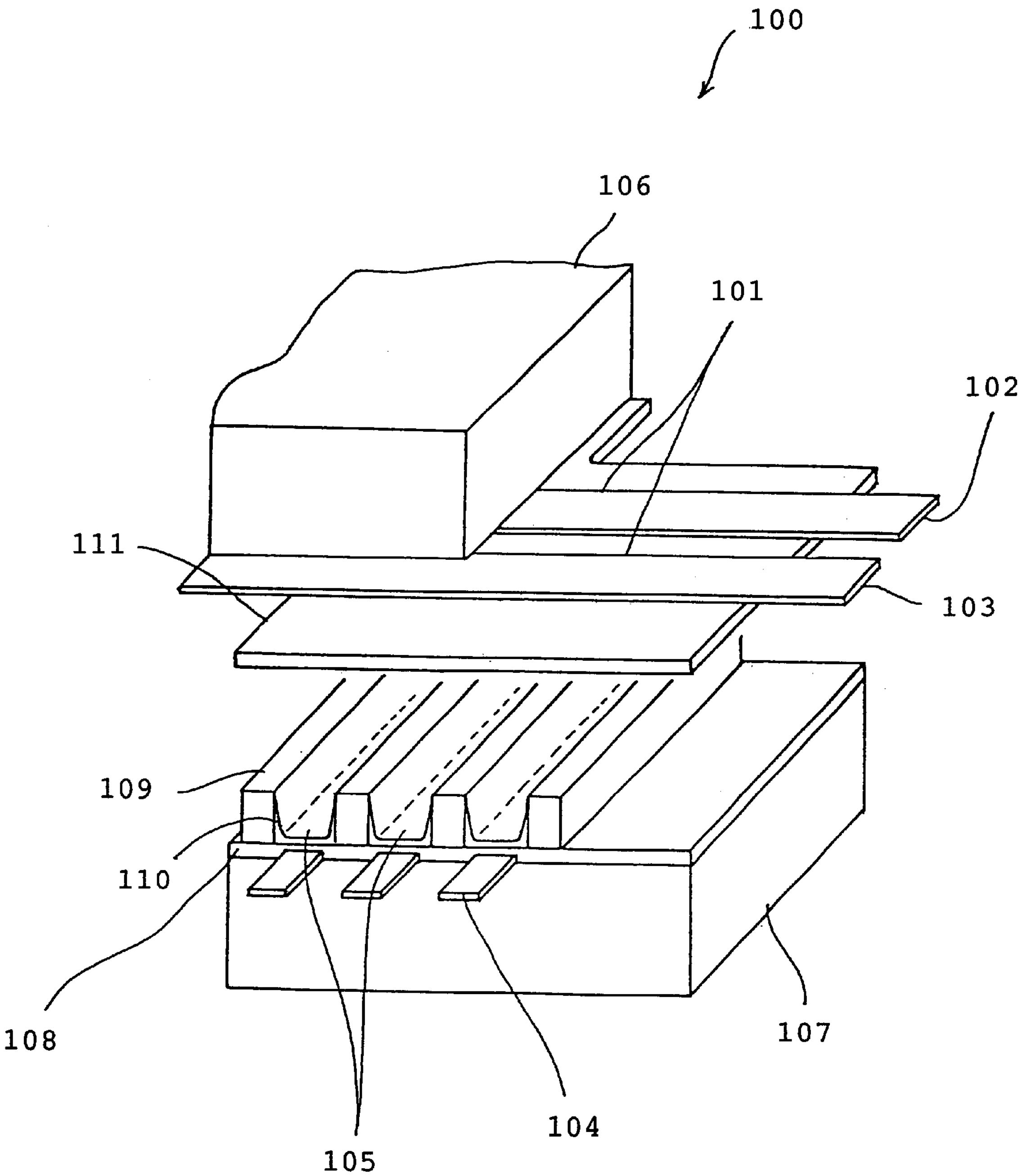
Fig. 1 (Prior Art)
FIG. 1 is a fragmentary exploded perspective view of a conventional plasma display panel.
Figure 4:
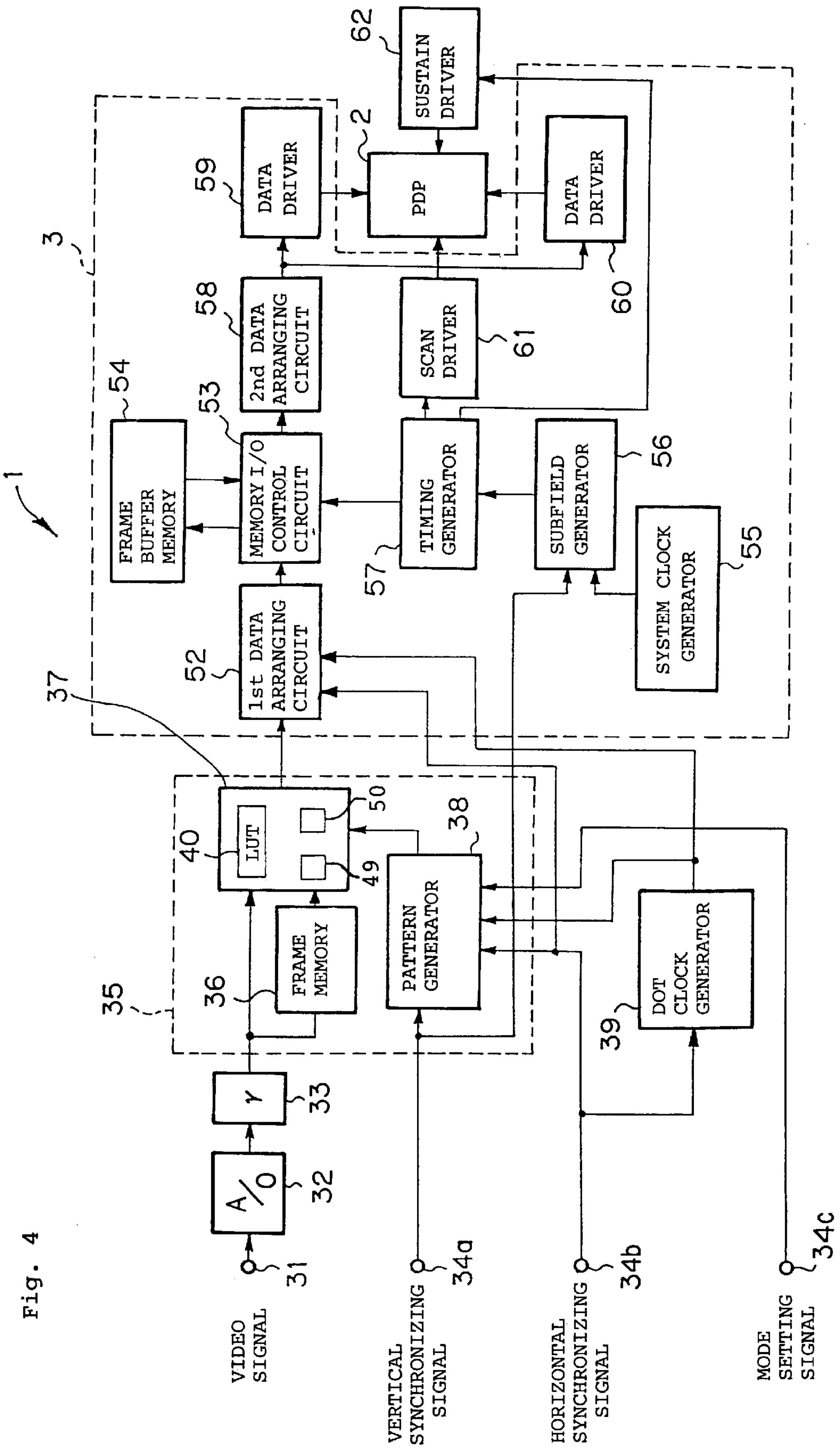
FIG. 4 is a block diagram of a plasma display apparatus as a moving image display apparatus according to a first embodiment of the present invention.

As shown in FIG. 4, the plasma display apparatus 1, which is an AC plasma display apparatus, generally comprises a plasma display panel 2 and a drive circuit 3.

Figure 6:
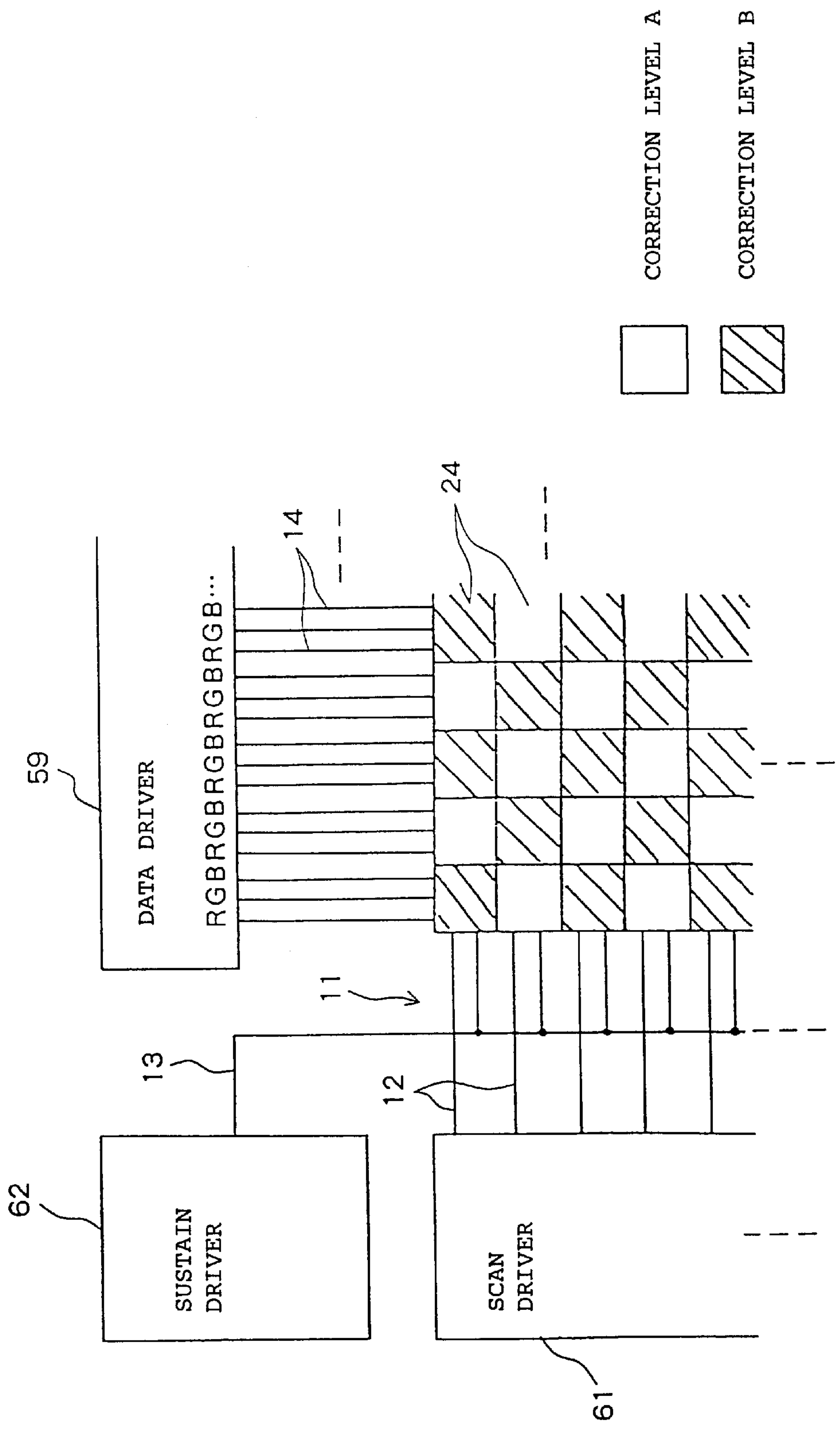
FIG. 6 is a diagram showing a selection pattern of dots on a display panel screen.

As shown in FIG. 6, the plasma display panel 2 comprises a plurality of surface discharge electrodes 11 extending parallel to rows and spaced successively along columns. Each of the surface discharge electrodes 11 comprises a scanning electrode 12 and a sustaining electrode 13 which are disposed parallel to each other.

A plurality of data electrodes 14 extending parallel to the columns are disposed in opposed relation to the surface discharge electrodes 11. The data electrodes 14 are spaced successively along the rows.

Discharge spaces (not shown) filled with a discharge gas such as of helium, neon, xenon, or the like are provided between the electrodes 11, 14, forming display pixels capable of individually emitting light at the points of intersection between the surface discharge electrodes 11 and the data electrodes 14.

The plasma display apparatus 1 is capable of displaying fully colored images. As shown in FIG. 6, the plasma display panel 2 comprises a two-dimensional matrix of square tricolor pixels 24 each comprising three vertically elongate display pixels which are coated respectively with R, G, B phosphors (red, green, and blue phosphors).

As shown in FIG. 4, the plasma display apparatus 1 has a data input unit 31 for being supplied with a video signal, an A/D (analog-to-digital) converter 32 connected to the data input unit 31, and a gamma (γ) corrector 33 connected to the A/D converter 32.

The data input unit 31 is supplied with a video signal composed of many gradation data. The A/D converter 32 quantizes analog gradation data of a video signal from the data input unit 31 into digital gradation data. The gamma corrector 33 corrects the gradations of digital gradation data from the A/D converter 32.

The plasma display apparatus 1 also has signal input units 34*a*–34*c* for being supplied with a vertical synchronizing signal, a horizontal synchronizing signal, and a mode setting signal, respectively. The signal input unit 34*a* and the gamma corrector 33 are connected to a data correcting circuit 35.

The data correcting circuit 35 has a frame memory 36 inserted in one of two signal lines from the gamma corrector 33. The two signal lines from the gamma corrector 33 are connected to a processing circuit 37 of the data correcting circuit 35.

The signal input units 34*a*–34*c* are connected to a pattern generator 38 of the data correcting circuit 35. The pattern generator 38 is connected to the processing circuit 37.

The signal input unit 34*b* is connected to a dot clock generator 39 which is connected to the pattern generator 38.

The frame memory 36 temporarily stores one frame, at a time, of gradation data and outputs the stored frame after having delayed same for a period of time which corresponds to the duration of one frame.

The processing circuit 37 has a LUT (Look-Up Table) 40 which stores corrective data that can be addressed by gradation data of a preceding frame and gradation data of a present frame. The processing circuit 37 also has a data reading circuit 49 and a correction executing circuit 50. The data reading circuit 49 reads corrective data from the LUT 40 which have been addressed by gradation data of a present frame directly supplied from the gamma corrector 33 and gradation data temporarily stored in the frame memory 36.

Since gradation data comprise numerical values representing gradation levels, for example, the corrective data are established as numerical values for increasing and reducing the numerical values representing gradation levels.

The correction executing circuit 50 adds positive or negative numerical values of the corrective data read from the LUT 40 to the numerical values representing gradation levels of the gradation data of the present frame, for thereby correcting the gradation data with the corrective data.

The pattern generator 38 which is connected to the correction executing circuit 50 generates a selection pattern for controlling the level of correction by the correction executing circuit 50.

Figure 5:
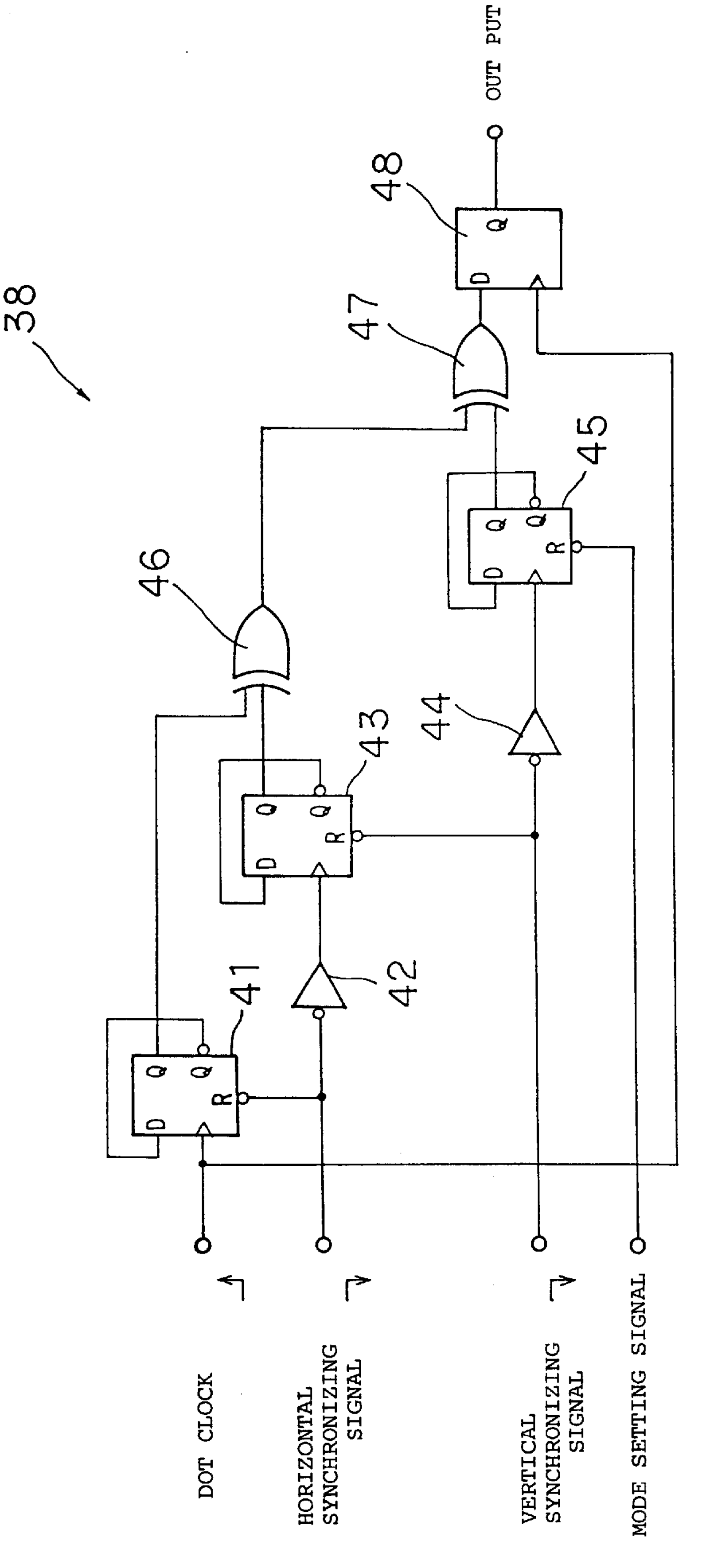
FIG. 5 is a block diagram of a pattern generator of the plasma display apparatus shown in FIG. 4.

More specifically, as shown in FIG. 5, the pattern generator 38 comprises a first D-type flip-flop 41 having a data input terminal for being supplied with a dot clock signal and a reset input terminal for being supplied with the horizontal synchronizing signal, a second D-type flip-flop 43 having a data input terminal for being supplied with the horizontal synchronizing signal through an inverter 42 and a reset input terminal for being supplied with the vertical synchronizing signal, and a third D-type flip-flop 45 having a data input terminal for being supplied with the vertical synchronizing signal through an inverter 44 and a reset input terminal for being supplied with the mode setting signal.

The first and second flip-flops 41, 43 are connected to respective input terminals of a first exclusive-OR gate 46. The output terminal of the first a exclusive-OR gate 46 and the third flip-flop 45 are connected to respective input terminals of a second exclusive-OR gate 47. The second exclusive-OR gate 47 has an output terminal connected to a data input terminal of a fourth D-type flip-flop 48, which has a reset input terminal for being supplied with the dot clock signal. The fourth flip-flop 48 is connected to the correction executing circuit 50 of the processing circuit 37.

The pattern generator 38 outputs a signal for controlling the level of correction by the correction executing circuit 50 depending on the dot clock signal, the horizontal synchronizing signal, the vertical synchronizing signal, and the mode setting signal. As shown in FIG. 6, the selection pattern generated by the pattern generator 38 has the level of correction reversed for every tricolor pixel 24 and-also for every scanning line, and is reversed for every frame.

The data correcting circuit 35 is connected to the drive circuit 3, which is connected to the plasma display panel 2.

The drive circuit 3 includes a first data arranging circuit 52 connected to the processing circuit 37, a memory input/output control circuit 53 connected to the first data arranging circuit 52, and a frame buffer memory 54 connected to the memory input/output control circuit 53.

The signal input unit 34*b* and the dot clock generator 39 are connected to the first data arranging circuit 52.

The first data arranging circuit 52 mixes R, G, B gradation data supplied from the processing circuit 37 and arranges the gradation data such that their addresses differ for respective gradation bits.

The memory input/output control circuit 53 controls storing of the mixed R, G, B gradation data into and reading of the mixed R, G, B gradation data from the frame buffer memory 54. The frame buffer memory 54 temporarily stores the mixed R, G, B gradation data.

The drive circuit 3 also has a subfield generator 56 connected to the signal input unit 34*a*, a system clock generator 55, and a timing generator 57 which is connected to the memory input/output control circuit 53.

The memory input/output control circuit 53 is connected through a second data arranging circuit 58 to upper and lower data drivers 59, 60, which are connected to the data electrodes 14 of the plasma display panel 2.

The timing generator 57 is connected to a scan driver 61 and a sustain driver 62. The scan driver 61 is connected to the scanning electrodes 12, and the sustain driver 62 is connected to the sustaining electrodes 13.

The system clock generator 55 generates a system clock signal. The subfield generator 56 generates subfields of various intervals at various times in one frame in synchronism with the system clock signal that is generated by the system clock generator 55 based on the vertical synchronizing signal from the signal input unit 34*a*.

The timing generator 57 supplies a subfield timing signal to the memory input/output control circuit 53, the scan driver 61, and the sustain driver 62.

The second data arranging circuit 58 converts the arrangement of gradation data into a form corresponding to an actual displayed image. The data drivers 59, 60 output data pulses to the data electrodes 14 of the plasma display panel 2 depending on gradation data.

The scan driver 61 outputs scanning pulses as drive pulses to the scanning electrodes 12 of the plasma display panel 2 depending on the subfield timing signal from the timing generator 57. The sustain driver 62 outputs sustaining pulses as drive pulses to the sustaining electrodes 13 of the plasma display panel 2 depending on the subfield timing signal from the timing generator 57.

When a video signal composed of many gradation data individually set to respective gradation levels is supplied from an external source to the plasma display apparatus 1, the display pixels of the tricolor pixels 24 of the plasma display panel 2 are individually energized for displaying a color image whose colors are expressed by the pixels for desired gradations.

When a video signal representing a moving image is supplied frame by frame to the plasma display apparatus 1, if the gradation data of a preceding frame and the gradation data of a present frame match a predetermined combination of gradation data, then the gradation level of the gradation data of the present frame is corrected to prevent false moving image contours from being generated.

At this time, the level of correction of the gradation data for preventing false moving image contours from being generated is controlled depending the matrix arrangement of the pixels of the plasma display panel 2 and the frames according to the selection pattern.

A method of displaying moving images on the plasma display panel 2 according to the first embodiment of the present invention will be described below.

When a video signal composed of many gradation data individually set to respective gradation levels is supplied frame by frame to the signal input unit 31, the supplied analog R. G, B gradation data are converted by the A/D converter 32 into digital gradation data, whose gradations are inversely gamma-corrected by the gamma corrector 33.

The corrected gradation data are supplied frame by frame to the data correcting circuit 35, in which the gradation data are temporarily stored frame by frame in the frame memory 36. The processing circuit 37 reads corrective data from the LUT 40 which are addressed by the temporarily stored gradation data of a preceding frame and newly supplied gradation data, and adds the corrective data to the gradation data to be displayed, for thereby correcting the gradation data.

Depending on a vertical synchronizing signal, a horizontal synchronizing signal, and a mode setting signal that are supplied frame by frame to the signal input units 34*a*–34*c*, the pattern generator 38 controls the level of data correction by the processing circuit 37 with a selection pattern.

Specifically, in the processing circuit 37, the first flip-flop 41 frequency-divides the frequency of the dot clock signal from the dot clock generator 39 to half, and is reset by the horizontal synchronizing signal to output a low level at the time of starting a main scanning cycle.

The horizontal synchronizing signal from the signal input unit 34*b* has positive-going edges made effective by the inverter 42, and is frequency-divided as a clock signal to half by the second flip-flop 43. Output signals from the first and second flip-flops 41, 43 are converted by the exclusive-OR gate 46 into a checkerboard-like selection pattern which has the level of correction reversed for every tricolor pixel and every scanning line.

The vertical synchronizing signal from the signal input unit 34*a* has positive-going edges made effective by the inverter 44, and is frequency-divided as a clock signal to half by the third flip-flop 45. Output signals from the third flip-flop 45 and the exclusive-OR gate 46 are converted into a selection pattern which is reversed for every frame. The resultant selection pattern is outputted from the fourth flip-flop 48 to the processing circuit 37 in synchronism with the mode setting signal.

In the plasma display apparatus 1 according to the first embodiment, the processing circuit 37 is arranged to correct false moving image contours excessively and to decimate such excessive correction events based on the selection pattern.

For example, as shown in FIGS. 7*a* through 7*g* and the Table shown below, when the gradation level of gradation data which is expressed in one of 64 6-bit gradation levels changes from "32" to "31", the gradation data typically suffers a false moving image contour.

TABLE 1

| | Data | | |
|---|---|---|---|
| Signal | Pixel data of (n − 1)th frame | Pixel data of nth frame | Pixel data of (n + 1)th frame |
| Input | 100000 | 011111 | 011111 |
| Uncorrected output | 100000 | 011111 | 011111 |
| Optimally corrected output | 100000 | 101010 | 011111 |
| Excessively corrected output | 100000 | 110100 | 011111 |

According to a conventional process for correcting all the gradation data, corrective data of "11", for example, is added to the gradation data, so that the gradation level of the gradation data in the present frame is "42".

With the plasma display apparatus 1 according to the first embodiment, since the gradation level of only half of the gradation data is corrected, corrective data of "21", for example, is added to the gradation data, so that the gradation level of the gradation data in the present frame is "52".

Of display pixels at positions where false moving image contours occur, one half positioned in a checkerboard pattern as shown in FIG. 6 is excessively corrected, and the remaining half is not corrected.

R, G, B gradation data which have been corrected for false moving image contours and outputted frame by frame from the data correcting circuit 35 are mixed and arranged such that their addresses differ for respective gradation bits. The arranged gradation data are then temporarily stored in the frame buffer memory 54 by the memory input/output control circuit 53.

The subfield generator 56 which is supplied with a system clock signal from the system clock generator 55 generates subfields in synchronism with the system clock signal based on the vertical synchronizing signal The subfield generator 56 outputs a subfield timing signal to the timing generator 57, from which the subfield timing signal is supplied to the memory input/output control circuit 53, the scan driver 61, and the sustain driver 62.

The memory input/output control circuit 53 reads the frame of gradation data temporarily stored in the frame buffer 54 in synchronism with the subfield timing signal. The frame of gradation data is converted into a form corresponding to an actual displayed image by the second data arranging circuit 58, and then outputted as data pulses from the data drivers 61, 62 to the data electrodes 14 of the plasma display panel 2.

At the same time, the scan driver 61 outputs scanning pulses as drive pulses in response to the subfield timing signal to the scanning electrodes 12 of the plasma display panel 2 for thereby writing wall charges in display pixels which are to emit light, in each subfield.

When wall charges are written in all the display pixels, the sustain driver 62 outputs sustaining pulses as drive pulses to the sustaining electrodes 13 to cause the display pixels in which the wall charges have been written to emit light.

Since the wall charges are written according to the data pulses and the scanning pulses and the sustaining pulses are outputted in each subfield of one frame, the display pixels of the plasma display panel 2 display respective gradations.

Three R, G, B display pixels are combined into a single tricolor pixel 24, and a plurality of tricolor pixels 24 are arranged in a two-dimensional matrix. Therefore, a fully colored image whose colors are rendered by the respective tricolor pixels 24 is displayed on the plasma display panel 2.

The plasma display apparatus 1 displays successive frames of a fully colored image, and hence displays a fully colored moving image whose colors are rendered by the respective tricolor pixels 24.

Because gradations are expressed according to the subfield process, when the displayed image moves on the plasma display panel 2, the displayed image tends to suffer a false moving image contour. The plasma display apparatus 1 corrects the gradation levels of those display pixels which are expected to suffer a false moving image contour.

The gradation levels of display panels are excessively corrected as is the case with the conventional process, and the excessive correction is carried out for only half of the display pixels which are dispersed two-dimensionally according to the selection pattern.

Stated otherwise, a region where a false moving image contour occurs contains excessively corrected display pixels and uncorrected display pixels which are mixed together in a two-dimensional pattern at a ratio of 1:1. Therefore, the display pixels are visually perceived as being adequately corrected as a whole.

Figures 7A, 7B, 7C, 7D, 7E, 7F, 7G:
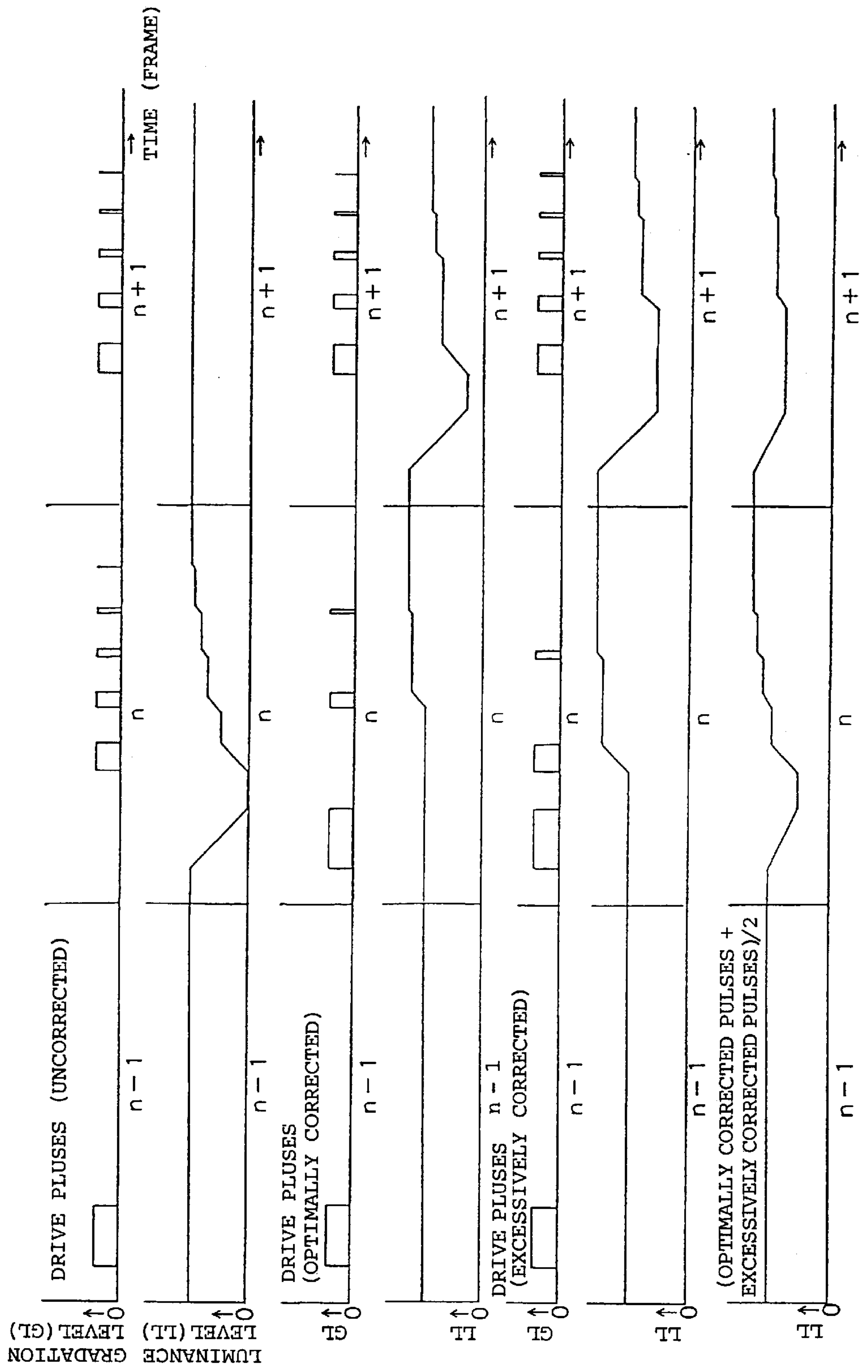
FIG. 7*a* is a timing chart of drive pulses which are uncorrected when the gradation level of gradation data varies.
FIG. 7*b* is a timing chart of a luminance level that is visually perceived when the drive pulses shown in FIG. 7*a* are applied.
FIG. 7*c* is a timing chart of drive pulses which are optimally corrected according to a conventional process when the gradation level of gradation data varies.
FIG. 7*d* is a timing chart of a luminance level that is visually perceived when the drive pulses shown in FIG. 7*c* are applied.
FIG. 7*e* is a timing chart of drive pulses which are excessively corrected according to the first embodiment of the present invention when the gradation level of gradation data varies.
FIG. 7*f* is a timing chart of a luminance level that is visually perceived when the drive pulses shown in FIG. 7*g* are applied.
FIG. 7*g* is a timing chart of a luminance level that is visually perceived according to the first embodiment of the present invention, the luminance level corresponding to the average of the luminance levels shown in FIGS. 7*d* and 7*f;*

As shown in FIGS. 7*a* and 7*b*, when the gradation level of gradation data which is expressed in one of 64 6-bit gradation levels changes from "32" to "31", the gradation data suffers a false moving image contour.

According to the conventional process for uniformly correcting all the gradation data at a position where a false moving image contour is generated, corrective data of "11" is added to the gradation data, so that the gradation level of the gradation data in the present frame is "42", as shown in FIGS. 7*c* and 7*d*.

If the gradation level of "31" follows subsequently, then when the corrected gradation level of "42" changes to "31", a false moving image contour occurs.

With the plasma display apparatus 1 according to the first embodiment, as shown in FIGS. 7*e* and 7*f*, since corrective data of "21" is added to one half of the gradation data at the position where a false moving image contour is generated, so that the gradation level of the gradation data in the present frame is "52". However, the gradation level of the remaining half of the gradation data remains to be "31" and is not corrected.

The excessively corrected gradation level and the uncorrected gradation level are visually perceived as being averaged as a whole. Therefore, as shown in FIG. 7*g*, a false moving image contour is effectively prevented from happening as a whole.

Consequently, the plasma display apparatus 1 according to the first embodiment is capable of correcting false moving image contours well when the display pixels arranged in a matrix are energized to express gradations according to the subfield process to display moving images on the plasma display panel 2.

Inasmuch as the plasma display panel 2 has a matrix of tricolor pixels 24 each comprising three R, G, B display pixels, the plasma display apparatus 1 can display colored moving images of good quality whose colors are rendered by the pixels.

Furthermore, the pattern generator 38 generates a selection pattern on a real-time basis with a hardware arrangement from various signals that have been extracted from a video signal. Therefore, it is not necessary to register in advance a selection pattern as image data in a memory.

The selection pattern has the level of correction reversed for every square tricolor pixel 24, composed of R, G, B display pixels, and also for every scanning line. Therefore, the level of correction is dispersed uniformly in a pattern of minute units for effectively preventing visually perceived false moving image contours from being generated.

The selection pattern which corresponds to the matrix of tricolor pixels 24 of the plasma display panel 2 is reversed every frame. Therefore, excessively corrected positions and uncorrected positions on the plasma display panel 2 are also dispersed in time for effectively preventing visually perceived false moving image contours from being generated.

The LUT 40 of the processing circuit 37 stores corrective data that can be addressed by gradation data of a preceding frame and gradation data of a present frame. Therefore, the gradation data of the present frame can be corrected at a desired gradation level depending on its combination with the gradation data of the preceding frame.

In the above embodiment, the plasma display apparatus 1 as the moving image display apparatus is a full color plasma display apparatus. However, the present invention is applicable to various image display apparatus in which the subfield process can be employed for displaying gradations at respective pixels.

In the above embodiment, the pattern generator 38 generates a selection pattern on a real-time basis with a hardware arrangement from various signals that have been extracted from a video signal. However, it is possible to read a selection pattern which has been stored in advance as image data in a memory, and use the selection pattern for the control of the level of correction.

In the above embodiment, the level of excessive correction on gradation data in a region where a false moving image contour is controlled by a selection pattern. However, for such correction level control, it is possible to combine slightly excessive correction and insufficient correction, combine highly excessive correction and opposite correction, and combine a plurality of stages of correction.

According to an experiment conducted by the inventors, the best results were obtained with a combination in which bit status changes responsible for a false moving image contour in a particular luminance transition were shifted one frame in time.

With the plasma display apparatus 1, since the level of excessive correction is controlled, one half of gradation data may be corrected at an excessive level that is established in advance, as with the conventional process, and the remaining half of gradation data may not be corrected at all. The overall processing operation of the plasma display apparatus 1 is thus simple and preferable.

In the above embodiment, the level of excessive correction is controlled in a rectangular range comprising a pixel for preventing false moving image contours in a pattern of minute units. However, the above range for correcting the level of correction may comprise a plurality of pixels for lessening the burden on the processing operation of the apparatus.

In the above embodiment, the two-dimensional selection pattern corresponding to the matrix of the plasma display panel 2 is switched in time. However, the two-dimensional selection pattern may be used as a fixed pattern without being switched in time.

In the above embodiment, because gradation data of a present frame is corrected in combination with gradation data of a preceding frame, the LUT 40 stores corrective data in advance which can be addressed by the gradation data of the preceding frame and the gradation data of the present frame.

However, the LUT 40 need not be employed, but a processor (not shown) may be employed to correct the gradation data of the present frame using parameters representing the gradation data of the preceding frame and the gradation data of the present frame.

According to the process of registering the corrective data in advance, the gradation data of the present frame can be corrected at a desired gradation level in combination with the gradation data of the preceding frame. However, if many gradation levels are involved, then it is necessary to register a large amount of corrective data.

According to the process of correcting the gradation data based on real-time processing, however, it is not necessary to register a large amount of corrective data, but there may be instances where it is difficult to correct the gradation data reliable at a desired gradation level.

Since these two processes have both advantages and disadvantages, it is preferable to select one of the processes in view of various conditions including apparatus performance levels and specifications.

A second embodiment of the present invention will be described below with reference to FIGS. 8 and 9*a* through 9*e*. Those parts of the second embodiment which are identical to those of the first embodiment are denoted by identical reference characters and will not be described in detail below.

A plasma display apparatus (not shown) as a moving image display apparatus according to the second embodiment has a hardware arrangement which is identical to that of the plasma display apparatus 1 according to the first embodiment, and differs from the plasma display apparatus 1 with respect to how subfields are established.

Figure 8:
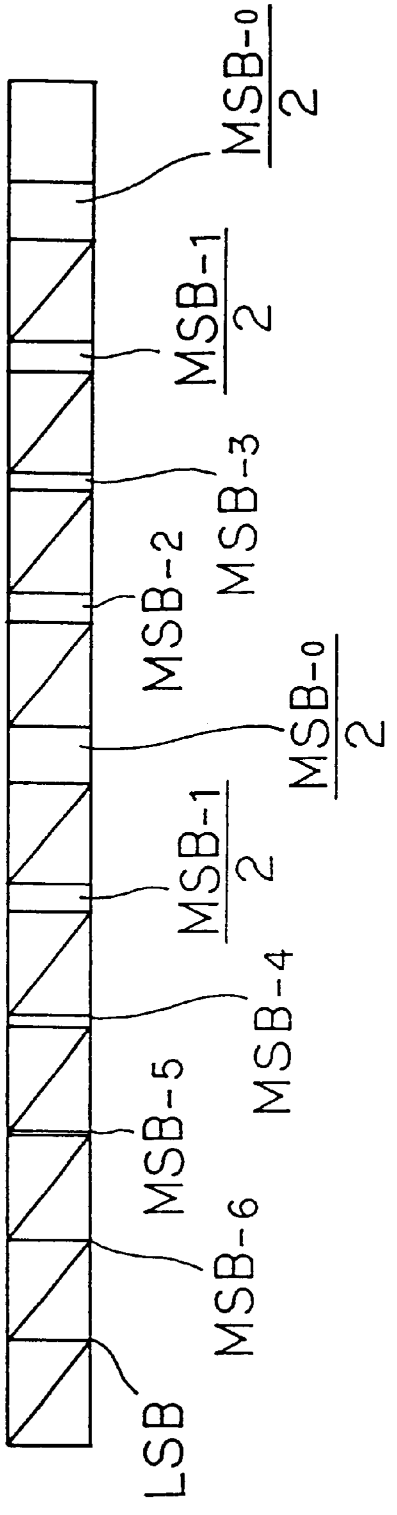
FIG. 8 is a diagram showing an arrangement of subfields in one frame in a plasma display apparatus as a moving image display apparatus according to a second embodiment of the present invention.

In the plasma display apparatus 1 according to the first embodiment, subfields are simply arranged in the order of their intervals within a frame. In the plasma display apparatus according to the second embodiment, however, as shown in FIG. 8, those of subfields "MSB" which have long intervals are divided into a plurality of subfields, which are dispersed.

For example, if a video signal is to be represented in 256 8-bit binary gradation levels, then, each of a longest subfield "MSB-0" and a second subfield "MSB-1" is divided into a plurality of subfields, and those divided subfields are dispersed.

Figures 9A, 9B, 9C, 9D, 9E:
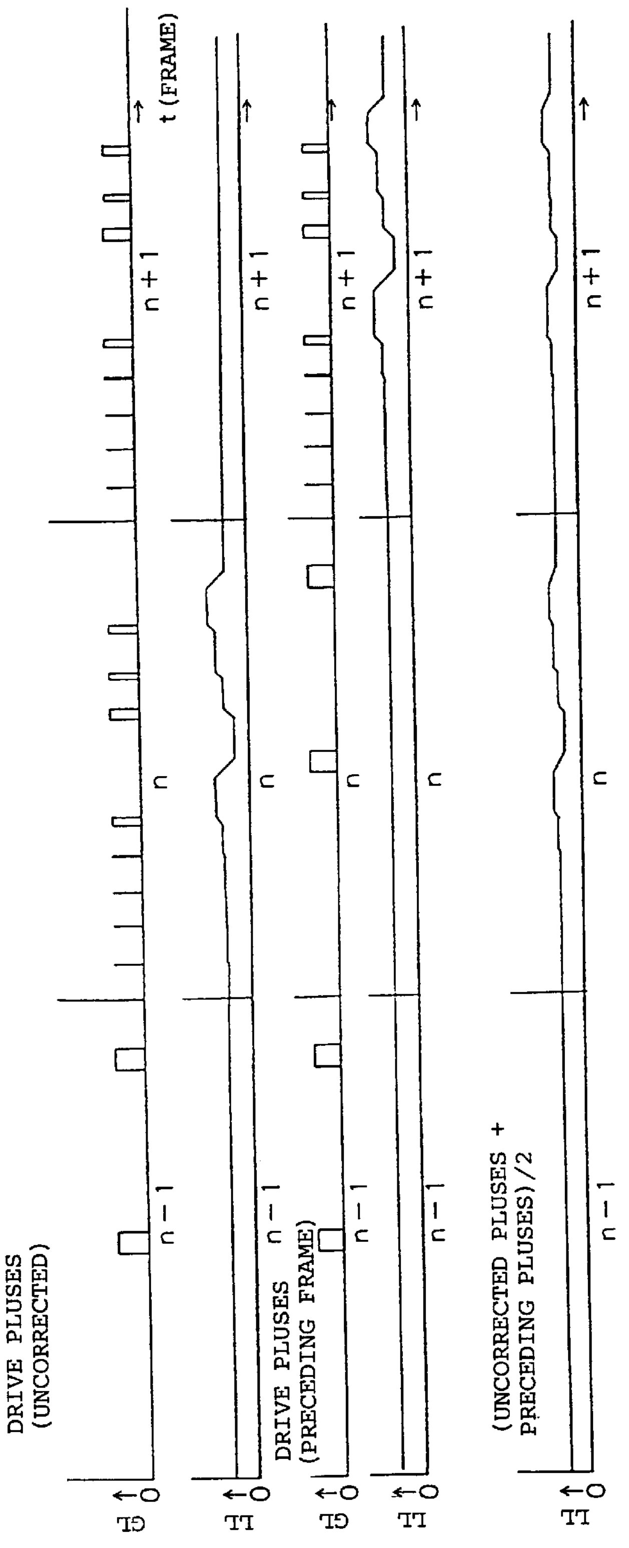
FIG. 9*a* is a timing chart of drive pulses which are uncorrected when the gradation level of gradation data varies.
FIG. 9*b* is a timing chart of a luminance level that is visually perceived when the drive pulses shown in FIG. 9*a* are applied.
FIG. 9*c* is a timing chart of drive pulses which are excessively corrected according to the second embodiment of the present invention when the gradation level of gradation data varies.
FIG. 9*d* is a timing chart of a luminance level that is visually perceived when the drive pulses shown in FIG. 9*c* are applied.
FIG. 9*e* is a timing chart of a luminance level that is visually perceived according to the second embodiment of the present invention, the luminance level corresponding to the average of the luminance levels shown in FIGS. 9*b* and 9*d*.

When the gradation level of a certain display pixel varies from "127" to "128", as shown in FIG. 9*a*, since drive pulses are dispersed, a false moving image contour is prevented from occurring even without the correction level control according to the present invention if the moving image moves at a low speed, as shown in FIG. 9*b*.

With subfields divided as described above, it is difficult to properly establish corrective data for excessively corrected pixels for visually eliminating a false moving image contour in combination with uncorrected pixels.

According to the second embodiment, gradation data of a preceding frame is simply regarded as corrected gradation data, and the corrected gradation data and uncorrected gradation data are disposed according to a selection pattern.

In the plasma display apparatus according to the second embodiment, subfields having long intervals are divided into a plurality of subfields, and gradation data of a preceding frame is regarded as corrected gradation data, and the corrected gradation data and uncorrected gradation data are disposed according to a selection pattern.

Since a false moving image contour is dispersed in a wide range, the false moving image contour is increased in area and averaged as a whole, thus improving the quality of a moving image which is visually perceived by the human eye.

Those gradation data of low gradations for which no subfields are divided and which are arranged in the order of their time intervals are preferably corrected in the same manner as with the first embodiment, and dispersed according to a selection pattern.

Figure 10:
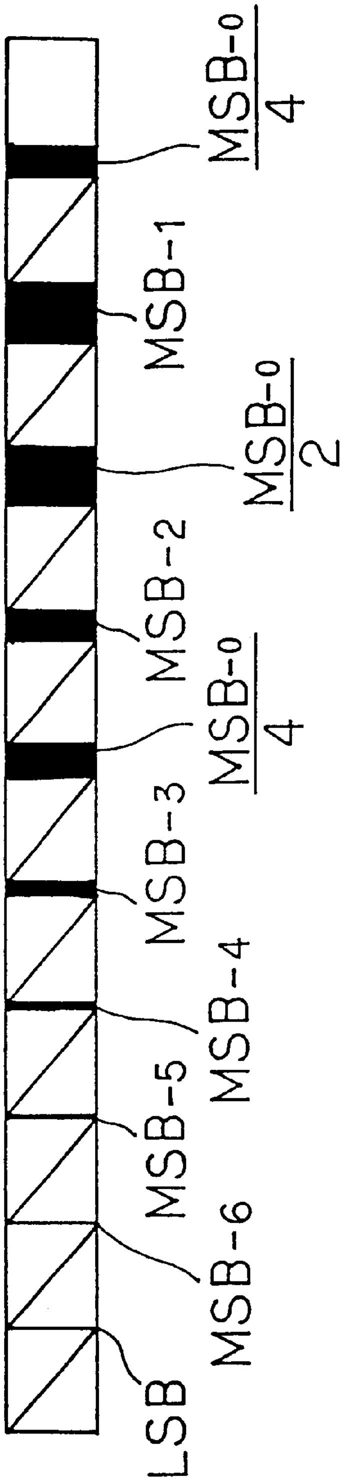
FIG. 10 is a diagram showing an arrangement of subfields in one frame in a plasma display apparatus as a moving image display apparatus according to a third embodiment of the present invention.

A third embodiment of the present invention will be described below with reference to FIG. 10.

In the plasma display apparatus (not shown) used as a moving image display apparatus according to the third embodiment, a longest subfield "MSB-0" is divided into a subfield which is ½ of the subfield "MSB-0" and two subfields each of which is ¼ of the subfield "MSB-0". Furthermore, gradation data of a preceding frame is regarded as corrected gradation data, and the corrected gradation data and uncorrected gradation data are disposed according to a selection pattern.

In the plasma display apparatus according to the third embodiment, subfields having long intervals are divided into a plurality of subfields, and gradation data of a preceding frame are regarded as corrected gradation data, and the corrected gradation data and uncorrected gradation data are disposed according to a selection pattern. Therefore, a false moving image contour is dispersed in a wide range, thus improving the quality of a moving image which is visually perceived by the human eye.

While preferred embodiments of the present invention have been described using specific terms, such description is for illustrative purposes only, and it is to be understood that changes and variations may be made without departing from the spirit or scope of the following claims.

What is claimed is:

1. A method of displaying a moving image by dividing a frame into a plurality of subfield having different relative luminance ratios and displaying a moving image of multiple gradations on a display panel having a matrix of display pixels, comprising the steps of:

producing new n (n is a natural number) corrected video gradation data from video gradation data of a preceding frame and video gradation data of a present frame for each of the display pixels;

selecting a combination of:

(1) at least two of: (a) said video gradation data of the preceding frame, (b) said video gradation data of the present frame, and (c) said n corrected video gradation data; or (2) at least two of said n corrected video gradation data; and displaying the selected video gradation data at display pixels of a predetermined selection pattern, the displayed video gradation data comprising:

(1) at least one of said (a) and (b), said (a) and (c), and said (b) and (c) combinations; or (2) said combination of said at least two of said n corrected video gradation data.

2. A method according to claim 1, wherein said predetermined selection pattern comprises a pattern of horizontally adjacent display pixels among said display pixels.

3. A method according to any of claim 2, wherein said predetermined selection pattern comprises a combination of frames successively arranged in time.

4. A method according to claim 1, wherein said predetermined selection pattern comprises a pattern of vertically adjacent lines across said display pixels.

5. A method according to any of claim 4, wherein said predetermined selection pattern comprises a combination of frames successively arranged in time.

6. A method according to claim 1, wherein said predetermined selection pattern comprises a checkerboard pattern of horizontally and vertically arranged display pixels among said display pixels.

7. A method according to any of claim 6, wherein said predetermined selection pattern comprises a combination of frames successively arranged in time.

8. A method according to claim 1, wherein said predetermined selection pattern comprises a randomly dispersed pattern.

9. A method of displaying a moving image by dividing a frame into a plurality of subfields having different relative luminance ratios and displaying a moving image of multiple gradations on a display panel having a matrix of display pixels, comprising the steps of:

producing new n (n is a natural number) corrected video gradation data from video gradation data of a preceding frame and video gradation data of a present frame for each of the display pixels;

selecting a plurality of said video gradation data including:

(1) at least two of: (a) said corrected video gradation data among said video gradation data of the preceding frame, (b) said video gradation data of the present frame, and (c) said n corrected video gradation data; or (2) at least two of said n corrected video gradation data; and combining the selected at least two of said video gradation data with each other and dispersing the combined video gradation data in a pixel plane of the display pixels according to a predetermined selection pattern, the dispersed video gradation data comprising:

(1) at least one of said (a) and (b), said (a) and (c), and said (b) and (c) combinations; or (2) said combination of said at least two of said n corrected video gradation data.

10. A method of displaying a moving image by dividing a frame into a plurality of subfields having different relative luminance ratios and displaying a moving image of multiple gradations on a display panel having a matrix of display pixels, comprising the steps of:

producing new n (n is a natural number) corrected video gradation data from video gradation data of a preceding frame and video gradation data of a present frame for each of the display pixels;

selecting a plurality of said video gradation data including: (a) at least one of (i) said corrected video gradation data and (ii) said video gradation data of the present frame among said video gradation data of the preceding frame, (b) said video gradation data of the present frame, and (c) at least two of said n corrected video gradation data; and combining the selected video gradation data with each other and dispersing the combined video gradation data in a pixel plane of the display pixels according to a predetermined selection pattern, the dispersed video gradation data comprising:

(1) at least one of said (a) and (b), said (a) and (c), and said (b) and (c) combinations; or (2) said combination of said at least two of said n corrected video gradation data.

11. A method of displaying a moving image by dividing a frame into a plurality of subfields having different relative luminance ratios and displaying a moving image of multiple gradations on a display panel having a matrix of display pixels, comprising the steps of:

producing new n (n is a natural number) corrected video gradation data from video gradation data of a preceding frame and video gradation data of a present frame for each of the display pixels;

selecting a plurality of said video gradation data including: (a) at least one of (i) said corrected video gradation data and (ii) said video gradation data of the preceding frame among said video gradation data of the preceding frame, (b) said video gradation data of the present frame, and (c) at least two of said n corrected video gradation data; and combining the selected video gradation data with each other and dispersing the combined video gradation data in a pixel plane of the display pixels according to a predetermined selection pattern, the dispersed video gradation data comprising:

(1) at least one of said (a) and (b), said (a) and (c), and said (b) and (c) combinations; or (2) said combination of said at least two of said n corrected video gradation data.

12. A method of displaying a moving image by dividing a frame into a plurality of subfield having different relative luminance ratios and displaying a moving image of multiple gradations on a display panel having a matrix of display pixels, comprising the steps of:

producing new n (n is a natural number) corrected video gradation data from video gradation data of a preceding frame and video gradation data of a present frame for each of the display pixels;

selecting:

(1) at least two of (a) said video gradation data of the preceding frame, (b) said video gradation data of the present frame, and (c) said n corrected video gradation data; or (2) at least two of said n corrected video gradation data; and combining the selected video gradation data of the preceding frame with said video gradation data of the present frame and dispersing the combined video gradation data in a pixel plane of the display pixels according to a predetermined selection pattern, the dispersed video gradation data comprising:

(1) at least one of said (a) and (b), said (a) and (c), and said (b) and (c) combinations; or (2) said combination of said at least two of said n corrected video gradation data.

13. A method of displaying a moving image by dividing a frame into a plurality of subfields having different relative luminance ratios and displaying a moving image of multiple gradation on a display panel having a matrix of display pixels, comprising the steps of:

producing new n (n is a natural number) corrected video gradation data from video gradation data of a preceding frame and video gradation data of a present frame for each of the display pixels;

selecting:

(1) at least two of (a) said video gradation data of the preceding frame, (b) said video gradation data of the present frame, and (c) said n corrected video gradation data; or (2) at least two of said n corrected video gradation data;

displaying the selected video gradation data at display pixels of a predetermined selection pattern, the displayed video gradation data comprising:

(1) at least one of said (a) and (b), said (a) and (c), and said (b) and (c) combinations; or (2) said combination of said at least two of said n corrected video gradation data; and if there is generated a gradation transition between said video gradation data of the preceding frame and said video gradation data of the present frame, combining (a) said video gradation data of the preceding frame and (b) said video gradation data of the present frame with each other and dispersing the combined video gradation data in a pixel plane of the display pixels according to a predetermined selection pattern, the dispersed video gradation data comprising at least said (a) and (b) combination.

14. An apparatus for displaying a moving image by dividing a frame into a plurality of subfields having different relative luminance ratios and displaying a moving image of multiple gradation on a display panel having a matrix of display pixels comprising:

data input means for entering data;

data storage means for storing video gradation data of a preceding frame corresponding to unit pixels of the display pixels;

data correcting means for producing new n (n is a natural number) corrected video gradation data from the video gradation data of the preceding frame stored in said data storage means and video gradation data of a present frame from said data input means; and correction control means for combining a plurality of video gradation data including:

(1) at least two of (a) said video gradation data of the preceding frame, (b) said video gradation data of the present frame, and (c) said n corrected video gradation data, or (2) at least two of said n corrected video gradation data, and dispersing the combined video gradation data in a pixel plane of the display pixels according to a predetermined selection pattern, the dispersed video gradation data comprising:

(1) at least one of said (a) and (b), said (a) and (c), and said (b) and (c) combinations; or (2) said combination of said at least two of said n corrected video gradation data.

15. An apparatus according to claim 14, wherein said correction control means comprises means for combining at least two of said n corrected video gradation data from said data correcting means with each other, and dispersing the combined video gradation data in the pixel plane of the display pixels according to said predetermined selection pattern.

16. An apparatus according to claim 14, wherein said correction control means comprises means for combining at least one of said n corrected video gradation data from said data correcting means with said video gradation data of the present frame from said data input means, and dispersing the combined video gradation data in the pixel plane of the display pixels according to said predetermined selection pattern.

17. An apparatus according to claim 14, wherein said correction control means comprises means for combining at least one of said n corrected video gradation data from said data correcting means with said video gradation data of the preceding frame from said data storage means, and dispersing the combined video gradation data in the pixel plane of the display pixels according to said predetermined selection pattern.

18. An apparatus according to claim 14, wherein said correction control means comprises means for combining said video gradation data of the preceding frame from said correcting means with said video gradation data of the present frame from said data input means, and dispersing the combined video gradation data in the pixel plane of the display pixels according to said predetermined selection pattern.

19. An apparatus according to claim 14, wherein said correction control means comprises means for combining said video gradation data of the preceding frame and said video gradation data of the present frame with each other, and dispersing the combined video gradation data in the pixel plane of the display pixels according to said predetermined selection pattern, if there is generated a gradation transition between said video gradation data of the preceding frame from said data correcting means and said video gradation data of the present frame from said data input means.

20. An apparatus according to claim 14, wherein said predetermined selection pattern comprises a pattern of horizontally adjacent display pixels among said display pixels.

21. An apparatus according to claim 20, wherein said predetermined selection pattern comprises a combination of frames successively arranged in time.

22. An apparatus according to claim 14, wherein said predetermined selection pattern comprises a pattern of vertically adjacent lines across said display pixels.

23. An apparatus according to claim 22, wherein said predetermined selection pattern comprises a combination of frames successively arranged in time.

24. An apparatus according to claim 14, wherein said predetermined selection pattern comprises a checkerboard pattern of horizontally and vertically arranged display pixels among said display pixels.

25. An apparatus according to claim 24, wherein said predetermined selection pattern comprises a combination of frames successively arranged in time.

26. An apparatus according to claim 14, wherein said predetermined selection pattern comprises a randomly dispersed pattern.

27. An apparatus for displaying a moving image by dividing a frame into a plurality of subfields having different relative luminance ratios and displaying a moving image of multiple gradations on a display panel having a matrix of display pixels, comprising:

an input which receives data;

a data storage which stores video gradation data of a preceding frame corresponding to unit pixels of the display pixels;

a data corrector which produces new n (n is a natural number) corrected video gradation data from the video gradation data of the preceding frame stored in said data storage and video gradation data of a present frame from said input; and a correction controller which combines a plurality of video gradation data including:

(1) at least two of (a) said video gradation data of the preceding frame, (b) said video gradation data of the present frame, and (c) said n corrected video gradation data, or (2) at least two of said n corrected video gradation data, and disperses the combined video gradation data in a pixel plane of the display pixels according to a predetermined selection pattern, the dispersed video gradation data comprising:

(1) at least one of said (a) and (b), said (a) and (c), and said (b) and (c) combinations; or (2) said combination of said at least two of said n corrected video gradation data.

* * * * *